United States Patent Office 2,946,789
Patented July 26, 1960

2,946,789
BIS MORPHOLINIUM SALTS

Aristotle G. Prapas, Baltimore, Md., assignor to W. R. Grace & Co., New York, N.Y., a corporation of Connecticut No Drawing. Filed Nov. 12, 1958, Ser. No. 773,141

5 Claims. (Cl. 260—247.5)

This invention relates to quaternary nitrogenous salts. In one specific aspect, it relates to bis-(N-aminomorpholinium) derivatives of alkanes.

It has been discovered that the bis morpholinium salts of my invention exhibit muscle relaxant properties and possess other desirable attributes.

It is, therefore, an object of the present invention to provide a new class of pharmaceutically useful compounds.

The compounds of my invention are conveniently prepared by the action of chloramine on the appropriate dimorpholinoalkane. In the preferred practice of my invention, the reactant ditertiary amine dissolved in an unreactive solvent is exposed to a stream of gaseous chloramine. The bis-N-aminomorpholinium dichloride results when an excess of chloramine is used and is isolated by conventional laboratory techniques. Compounds containing anions other than chloride are prepared by metathesis starting with the dichloride and a compound containing the anion to be introduced.

In accordance with the present invention, I have made available a new class of compounds corresponding to the general formula:

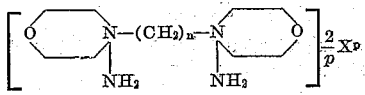

wherein $n$ is an integer having the values 6 to 12 inclusive, X is an anion bearing the charge $p$ and $$\frac{2}{p}$$

represents the number of anions required to balance the charge on the cation.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230, filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

It is thus seen that dimorpholinoalkanes of the type

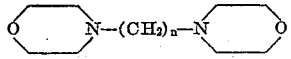

where $n$ equals 6 to 12 inclusive are suitable as starting materials for the preparation of my novel compounds by the methods discussed above. Such ditertiary amines are made by the reaction of alkylene dihalides on morpholine, followed by treatment with base.

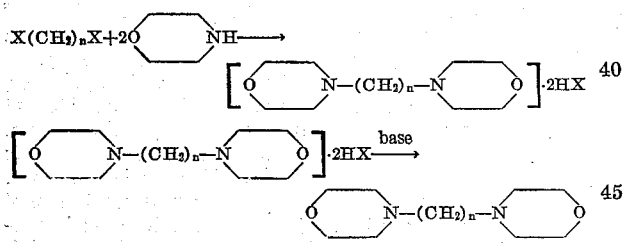

It is important to note that the simple dimorpholinoalkane hydrohalides shown as intermediates in the above equations do not exhibit the muscle relaxant properties possessed by the compounds of this invention.

The scope and utility of my invention is further illustrated by the following examples:

*Example I*

Preparation of 1,10-(4,4'-dimorpholino)decane. This compound was prepared by refluxing 48.0 g. (0.16 mol) of 1,10-dibromodecane with 55.8 g. (0.64 mol) of morpholine in 200 ml. of dry methanol for 25 hours. After the solvent had been evaporated, the residue was treated with an excess of 20% aqueous sodium hydroxide. The alkaline solution was extracted with several portions of chloroform, the combined extracts dried and chloroform and unreacted morpholine recovered by distillation at reduced pressures. Treatment of the residue with warm water gave pure material melting at 46–47° C. Equivalent weight found on titration with 0.1 N HCl: 155.90. Calculated for $C_{18}H_{36}N_2O_2$: 156.25.

*Example II*

A solution of 35 g. of 1,10-(4,4'-dimorphilino)decane in xylene was treated with chloramine by means of the chloramine-ammonia generator discussed above. Filtration of the reaction mixture gave 10.9 g. of crude 1,10-decamethylenebis-(4-aminomorpholinium chloride).

About 18.5 g. of unreacted 1,10-(4,4'-dimorpholino)decane was recovered after evaporation of xylene from the filtrate.

*Example III*

A superior method for preparing 1,10-decamethylene-bis-(4-aminomorpholinium chloride) was found to be the reaction of 1,10-(4,4'-dimorpholino)decane with excess chloramine using chloroform as the reaction solvent. The conversion was essentially quantitative as evidenced by the fact that evaporation of the filtrate (after removal of the insoluble product) yielded only a trace of starting material. The product was purified and separated from ammonium chloride by being continuously extracted with isopropyl alcohol in a Soxhlet extractor. The solids obtained from the isopropyl alcohol extracts were combined and recrystallized from ethyl alcohol. A second recrystallization from ethyl alcohol and drying in vacuo over phosphorus pentoxide gave pure 1,10-decamethylene-bis-(4-aminomorpholinium chloride) melting at 227–228° C with decomposition and having the structure shown below. Calculated for $C_{18}H_{40}N_4O_2Cl_2$: 52.04% C, 9.70% H, 13.49% N and 17.07% Cl. Found: 52.71% C, 9.38% H, 13.20% N and 16.88% Cl.

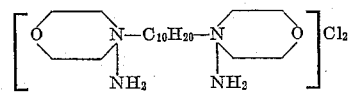

*Examples IV and V*

Separate portions of 1,10-decamethylene-bis-(4-aminomorpholinium chloride) were dissolved in water and treated with aqueous potassium hexafluorophosphate and with saturated aqueous picric acid. The resultant precipitates were collected by filtration and dried to give 1,10 - decamethylene-bis - (4 - aminomorpholinium fluorophosphate) melting at 231.5° C. with decomposition and 1,10-decamethylene-bis-(4-aminomorpholinium picrate) melting at 157–158° C. respectively.

*Example VI*

The classical rabbit head drop technique was employed to demonstrate the skeletal muscle relaxant properties of my novel compounds. Essentially, the method consists of injecting solutions of the test compounds in physiological saline into albino rabbits of either sex. The test solutions were administered intravenously at a slow rate until the characteristic head drop occurred or until it was evident that higher doses were impracticable. The dose which was just sufficient to cause head drop was then calculated. The results obtained with 1,10-decamethylene-bis-(4-aminomorpholinium chloride) are tabulated below:

| Solution | Conc., mg./kg. | Dose, mg./kg. | Head Drop* |
|---|---|---|---|
| Test | 3.0 | 3.0 | ± |
|  | 3.0 | 4.5 | + |
|  | 5.0 | 5.6 | + |
|  | 3.0 | 5.8 | ± |
|  | 5.0 | 5.9 | + |
|  | 3.0 | 6.7 | − |
|  | 3.0 | 6.8 | + |
| Control A | 0.02 | 0.06 | − |
|  | 1.0 | 3.13 | − |
|  | 10.0 | 8.8 | − |
| Control B | 0.02 | 0.06 | − |
|  | 1.0 | 2.57 | − |
|  | 10.0 | 27.4 | − |

*+ indicates head drop.  ± indicates questionable head drop.  − indicates no head drop.

I claim:

1. Compounds having the general formula:

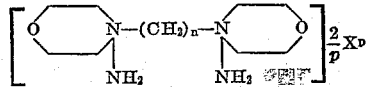

wherein $n$ is an integer having the values 6 to 12 inclusive and X is a pharmaceutically acceptable anion bearing the charge $p$.

2. Compounds according to claim 1 wherein $n$ has the value of 10.

3. 1,10 - decamethylene - bis - (4 - amino-morpholinium chloride).

4. 1,10 - decamethylene - bis - (4 - aminomorpholinium hexafluorophosphate).

5. 1,10 - decamethylene - bis - (4 - aminomorpholinium picrate).

No references cited.